United States Patent
Duncan et al.

[11] Patent Number: 5,847,695
[45] Date of Patent: Dec. 8, 1998

[54] METHOD AND APPARATUS FOR IMPLEMENTING A DIALPAD ON THE SURFACE OF A MOUSE INPUT DEVICE

[75] Inventors: Michael Glen Duncan, Austin; Roger Bjork, Round Rock, both of Tex.

[73] Assignee: Siemens Business Communication Systems, Inc., Santa Clara, Calif.

[21] Appl. No.: 583,168

[22] Filed: Jan. 4, 1996

[51] Int. Cl.[6] .............................. G09G 5/08; H04M 1/00
[52] U.S. Cl. ..................... 345/163; 345/166; 345/157; 379/368; 379/369; D14/114; D14/148; D14/247
[58] Field of Search ..................... 345/163, 164, 345/166, 156, 165, 167, 157; 379/156, 368, 52, 165, 110, 258, 329, 362, 369, 441; D14/114, 148, 247

[56] References Cited

U.S. PATENT DOCUMENTS

| | | | |
|---|---|---|---|
| D. 270,053 | 8/1983 | Bosch | D14/148 |
| D. 307,272 | 4/1990 | Desbarats | D14/148 |
| D. 322,066 | 12/1991 | Pasinski | D14/148 X |
| D. 327,064 | 6/1992 | Ditzig et al. | D14/148 |
| D. 339,582 | 9/1993 | Wong et al. | D14/148 |
| D. 365,551 | 12/1995 | Hayashi | D14/114 |
| D. 368,080 | 3/1996 | Aeschbacher et al. | D14/114 |
| D. 377,343 | 1/1997 | Tickle | D14/114 |
| 4,862,498 | 8/1989 | Reed | 379/355 |
| 4,994,795 | 2/1991 | MacKenzie | 345/163 |
| 5,063,376 | 11/1991 | Chang | 345/163 |
| 5,457,480 | 10/1995 | White | 345/163 |
| 5,555,894 | 9/1996 | Doyama et al. | 345/163 X |
| 5,583,541 | 12/1996 | Solhjell | 345/163 |
| 5,659,335 | 8/1997 | Partridge, III | 345/163 X |

*Primary Examiner*—Steven J. Saras
*Assistant Examiner*—Seth D. Vail

[57] ABSTRACT

An interface device, such as a mouse input device, is used to provide input to a computer system or alternatively to a telephone system. The motion of the mouse input device over a first surface is detected. Selections made by a user on a mouse selection key are also detected. Numeric entry is received from numeric entry keys on a top surface of the mouse input device. In the preferred embodiment, the numeric keys are arranged as a dialpad for a telephone.

26 Claims, 8 Drawing Sheets

METHOD AND APPARATUS FOR IMPLEMENTING A DIALPAD ON THE SURFACE OF A MOUSE INPUT DEVICE

BACKGROUND

The present invention concerns synergism between a computer system and a telephone system and particularly relates to a method and apparatus for implementing a dialpad on the surface of a mouse input device.

In personal computers which utilize a graphics interface, a pointing and selecting device, such as a mouse input device, is generally used. In the background art, there exist mouse input devices with a large number of keys; however, the keys are used to speed up the access of certain computing operations.

In almost all conventional telephones, the dialpad is integral to the phone, and in some cases, the phone handset. As high-end feature telephones add more features and functionality, the normal user interface of keys and displays on the phone limits the user's ability to effectively utilize the full capabilities of the phone. One of the primary limitations of a standard phone keypad is that it is tied to the phone base, which is often located at a back corner of a typical user's desk.

SUMMARY OF THE INVENTION

In accordance with the preferred embodiment of the present invention, a method and system are presented. An interface device, such as a mouse input device, is used to provide input. The motion of the mouse input device over a first surface is detected. Selections made by a user on a mouse selection key are also detected. Numeric entry is received from numeric entry keys on a top surface of the mouse input device.

In the preferred embodiment, the numeric keys are arranged as a dialpad for a telephone. In one embodiment, the dialpad for the telephone includes keys which are within a well on the top surface of the mouse input device. Alternatively, the dialpad for the telephone includes keys which are flush with the top surface of the interface device. To avoid a user detecting sharp edges, the keys may be placed right next to each other.

In a preferred embodiment of the present invention, motion of the mouse input device over the first surface is restricted when the dialpad is being used. This is done, for example, by hindering motion of a mouse input device ball within the mouse input device. Alternatively, motion of the mouse input device is restricted by extending feet from a bottom of the mouse input device to the first surface. In one embodiment, motion restriction is controlled by a sensor. The sensor detects when a user's hand is holding the mouse input device. For example, the sensor detects ambient light using an ambient light detector placed on a side of the mouse input device.

The mouse input device of the present invention may be used as an input device for both a personal computer and a feature telephone. For example, the mouse input device can include a switch. The state of the switch indicates whether information gathered by the mouse input device is for the personal computer or for the feature telephone. The personal computer, the feature telephone and the mouse input device can be linked in series. For example, when the feature telephone is connected between the personal computer and the mouse input device, the feature telephone receives information from the mouse input device and determines whether the information is for the feature telephone or the personal computer. The feature telephone passes along information for the personal computer to the personal computer.

The present invention allows for a single interface device to provide input to two or more separate systems. For example, in the preferred embodiment, placing a dialpad on a mouse input device allows for a mouse input device to be used as an input device for both a personal computer and a feature telephone. This provides for a versatile interface device which may be used in a variety of ways without cluttering a user's desk.

DESCRIPTION OF THE PREFERRED EMBODIMENT

Figure 1:
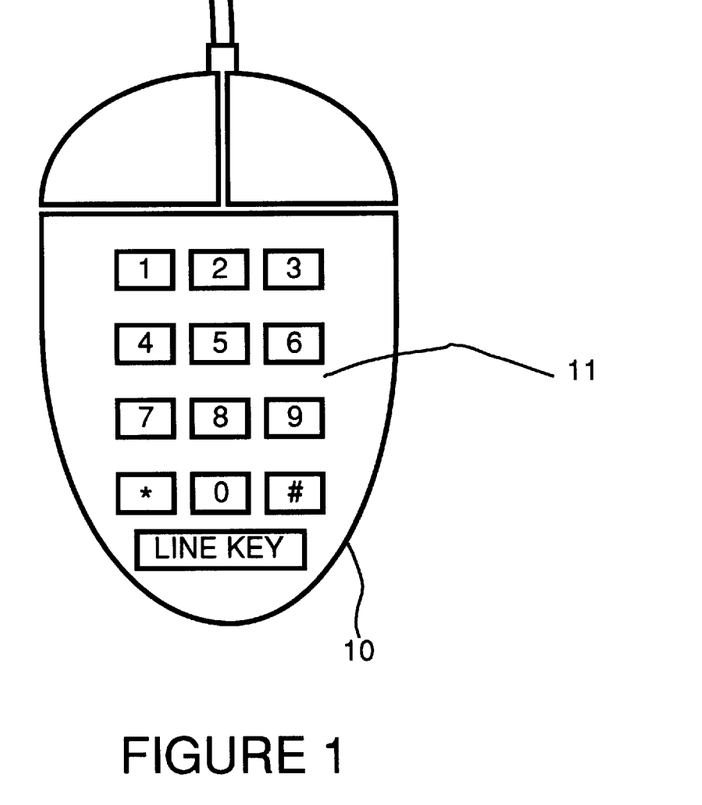
FIG. 1 shows a mouse input device with a dialpad placed on the surface of the mouse input device, in accordance with a preferred embodiment of the present invention.

FIG. 1 shows a mouse input device 10 which may be used for two purposes. Mouse input device 10 is used as a pointing and selection device for a personal computer. In addition, mouse input device 10 includes a dialpad 11 which allows the mouse input device to be used as a dialpad for a telephone system. Alternatively, instead of a dialpad, another numeric input device, such as a numeric keypad, may be placed on the surface of a mouse.

In order to minimize disruption of the use of mouse input device 10 as a pointing and selection device, dialpad 11 is recessed into the top surface of mouse input device 10 so that no rough or sharp edges appear along the surface of the mouse input device. In the embodiment shown in FIG. 1, rough and sharp edges are eliminated by placing keys of the dialpad flush with the top surface of mouse input device 10. The edges of each key have a slight downward radius along their top edges so that no rough spots exist.

Figure 2:
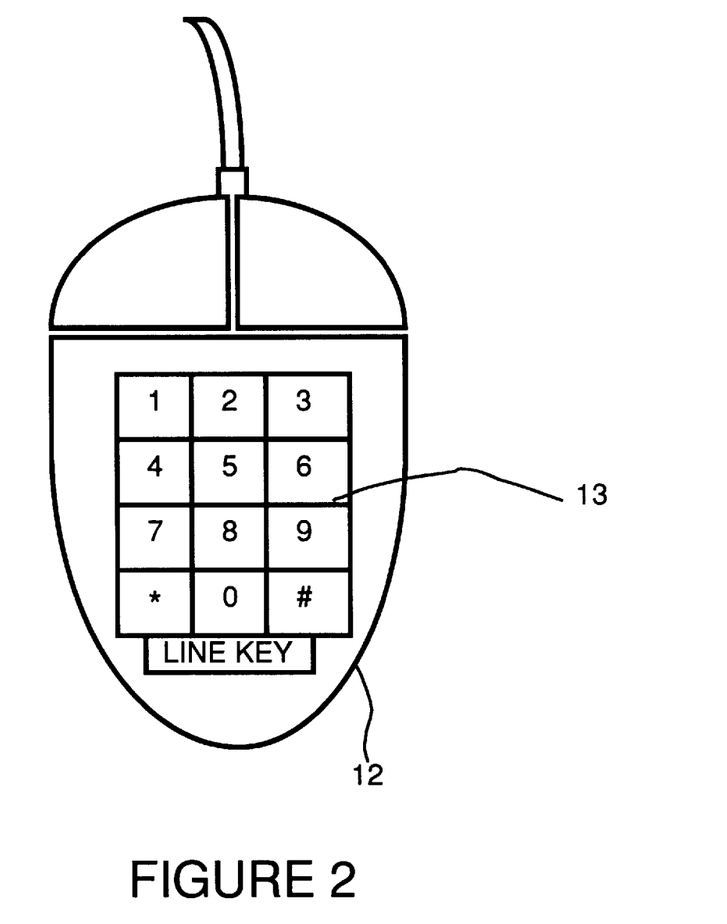
FIG. 2 shows a mouse input device with a dialpad placed on the surface of the mouse input device, in accordance with an alternative preferred embodiment of the present invention.

FIG. 2 shows an embodiment of the present invention where keys of a dialpad 13 on a mouse input device 12 are flush with the top surface and have no spaces between them. For example, dialpad 13 may be implemented using either individual keys or a touch pad. If keys are used, the edges of each key have a slight downward radius along their top edges so that no rough spots exist. The end result is that, to a user, mouse input device 12, when used as a pointing and selecting device, feels and operates as if dialpad 13 were not present.

Figure 3:
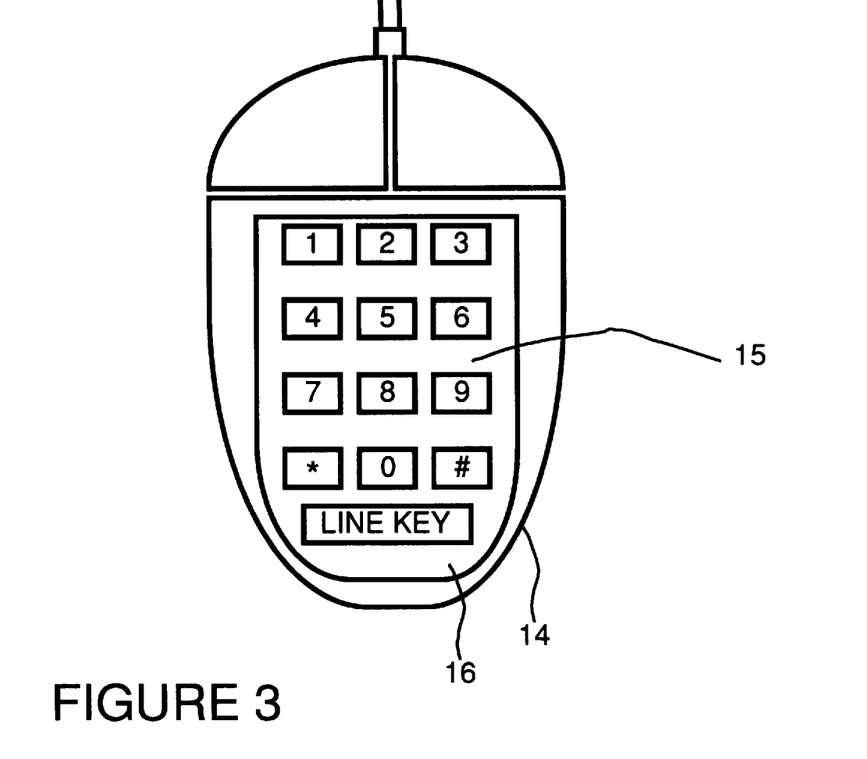
FIG. 3 shows a mouse input device with a dialpad placed on the surface of the mouse input device, in accordance with another alternative preferred embodiment of the present invention.

FIG. 3 shows another embodiment in which a dialpad 15 is recessed below the top surface of a mouse input device 14 in a well 16. The edges of well 16 are smoothly rounded to prevent discomfort when using the mouse input device as a pointing and selecting device. One advantage of placing dialpad 15 in well 16 is that this minimizes the possibility of a user accidentally depressing a key when using mouse input device 14 as a pointing and selecting device.

Figure 4:
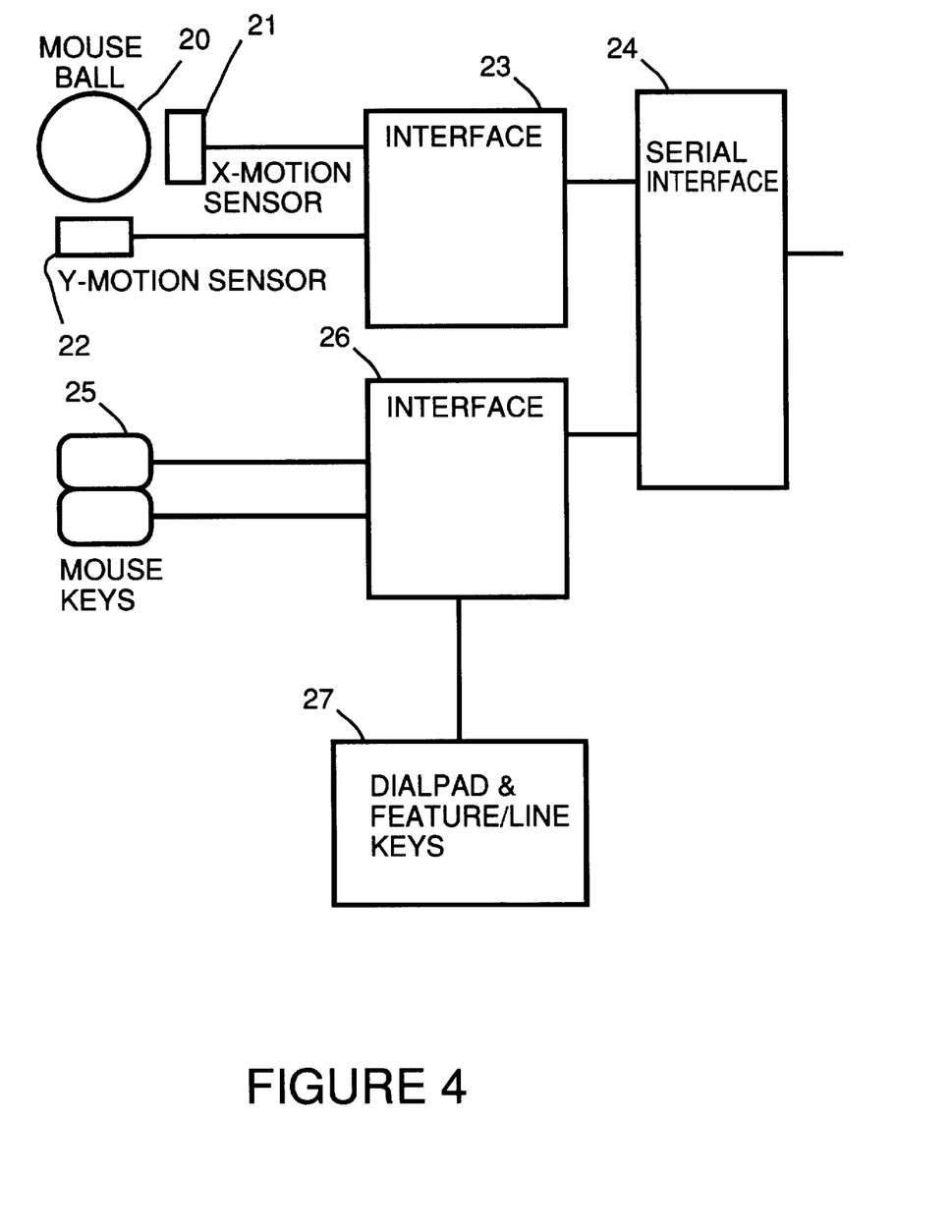
FIG. 4 shows a block diagram of circuitry within a mouse input device with a dialpad placed on the surface of the mouse input device, in accordance with a preferred embodiment of the present invention.

FIG. 4 shows a block diagram of circuitry within a mouse input device with a dialpad placed on the surface of a mouse input device. An interface 23, using an x-motion sensor 21 and a y-motion sensor 22, detects movement of mouse input device ball 20. Interface 23 sends motion data generated by x-motion sensor 21 and a y-motion sensor 22 to a serial interface 24. For example, serial interface 24 is a Universal Asynchronous Receiver Transmitter (UART) or another serial interface such as a Universal Serial Bus (USB) or GeoPort. Serial interface 24 forwards the motion data to a host device such as a personal computer or feature telephone.

An interface 26 receives keystroke data from mouse input device keys 25. In addition, interface 26 receives keystroke data from a dialpad 27 along with any feature/line keys associated with dialpad 27. The line key is used as a toggle switch to place the phone on line or to hang up an open line. Feature keys include, for example, keys for use to hold, transfer, conference, flash or mute a call. Interface 26 forwards keystroke information from mouse input device keys 25 and dialpad and feature/line keys 27 to serial interface 24. Serial interface 24 forwards the keystroke information to the host device.

Figure 5:
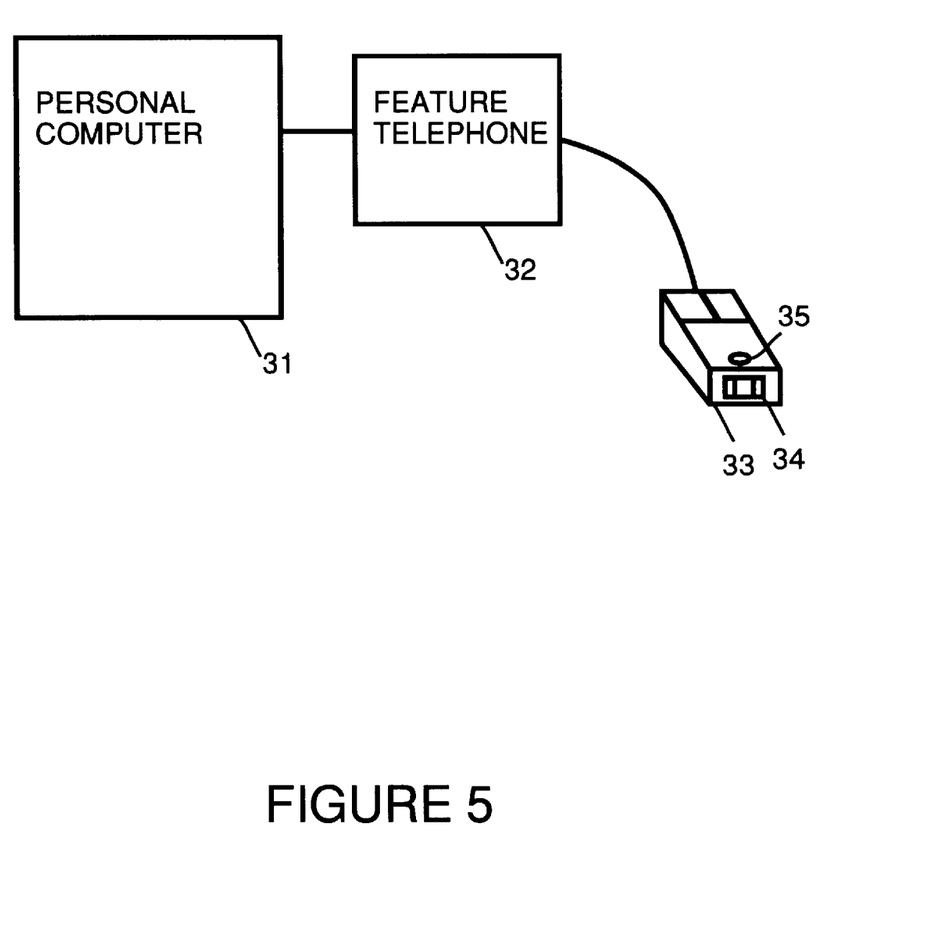
FIG. 5 shows a block diagram of circuitry used to process information from a mouse input device with a dialpad placed on the surface of the mouse input device, in FIG. 1, in accordance with a preferred embodiment of the present invention.

FIG. 5 shows a block diagram of circuitry used to process information from a mouse input device 33 which has a dialpad, as discussed above. A feature telephone 32 receives data from a serial interface within mouse input device 33. Feature telephone 32 intercepts information from the dialpad and feature/line keys. Information from the mouse input device keys and from motion detectors are forwarded to a personal computer 31 for processing.

In order to prevent accidental dialpad keystrokes when using the mouse input device as a pointing device feature telephone 32 only pays attention to dialpad keystrokes when feature telephone 32 is active (i.e. off-hook) . Feature telephone 32 ignores/discards any keystroke information which is received from mouse input device 33 when feature telephone 32 is not in use.

When feature telephone 32 goes active, either by pushing the line key or lifting a handset, the keys on the mouse dialpad are released for use. In an alternative embodiment, a mechanical key locking mechanism on mouse input device 33 prevents key movement during non-active times. Alternatively, a manual enable on the mouse input device may be used to activate/deactivate the dialpad. For example, the manual enable is implemented using the line key. When the line key is used to activate the dialpad, it is important to locate the line key on the mouse input device in such a way that it is very unlikely that the line key will be pushed in normal mouse input device operation. Alternatively, the toggle switch described below could be used to activate the dialpad. For the embodiment shown in FIG. 3 with the dialpad recessed below the top surface of the mouse input device in a well, it may not be necessary to protect against accidental dialpad keystrokes.

Using the system shown in FIG. 5, mouse input device 33 can be used as a pointing and selecting device for feature telephone 32 as well as personal computer 31. Since, in the preferred embodiment, mouse input device 33 also contains a telephone dialpad, mouse input device 33 can serve as a primary user interface device for both personal computer 31 and feature telephone 32.

When feature telephone 32 utilizes motion data from mouse input device 33 and also utilizes keystroke data from mouse input device keys of mouse input device 33, there needs to be a way to determine whether motion data from mouse input device 33 and/or keystroke data from mouse input device keys of mouse input device 33 are meant to be used by feature telephone 32 or by personal computer 31. This is done, for example, using a "toggle" switch 34 on mouse input device 33. A user can alternate between controlling feature phone 32 and personal computer 31 by depressing switch 34. Upon each depression, mouse input device 33 sends an indication of the "toggle" to feature telephone 32.

The embodiment shown in FIG. 5 provides for toggling between feature phone 32 and personal computer 31. However, as is clear, the toggling could be accomplished between additional devices chained together so that mouse input device 33 could be used as an input device to several devices. In this way, a single mouse input device is used as an interface to many devices. Toggling a switch or some other selection method is used by a user to select the device which is currently being controlled by the mouse input device.

In the embodiment of the present invention shown in FIG. 5, a speakerphone microphone 35 is included in mouse input device 33. This places the speakerphone microphone 35 close to a user, increasing the intelligibility of his speech. In addition, this reduces the transmit-to-receive coupling of the speakerphone, simplifying the speakerphone design. In this implementation, speakerphone microphone 35 is mounted so that the movements of mouse input device 33 are not coupled into speakerphone microphone 35.

One problem which can arise when a telephone dialpad (or other keys) are used on a mouse input device is movement of the mouse input device when dialpad keys are used. The movement occurs because a mouse input device must be freely moving to be effectively used as a pointing device. Therefore, it is desirable to prevent the mouse input device from moving so easily when dialpad keys are pressed.

In one embodiment of the present invention, "brakes" are placed on the mouse input device. This is done, for example, by preventing the mouse input device ball from moving. In one embodiment, this is implemented using sensors on the side of the mouse input device which release the brakes when the mouse input device is being used as a normal pointing device. When a hand is not on the sides of the mouse input device, the brakes are activated and the keys on the mouse input device can be used for dialing or feature access.

Figure 6:
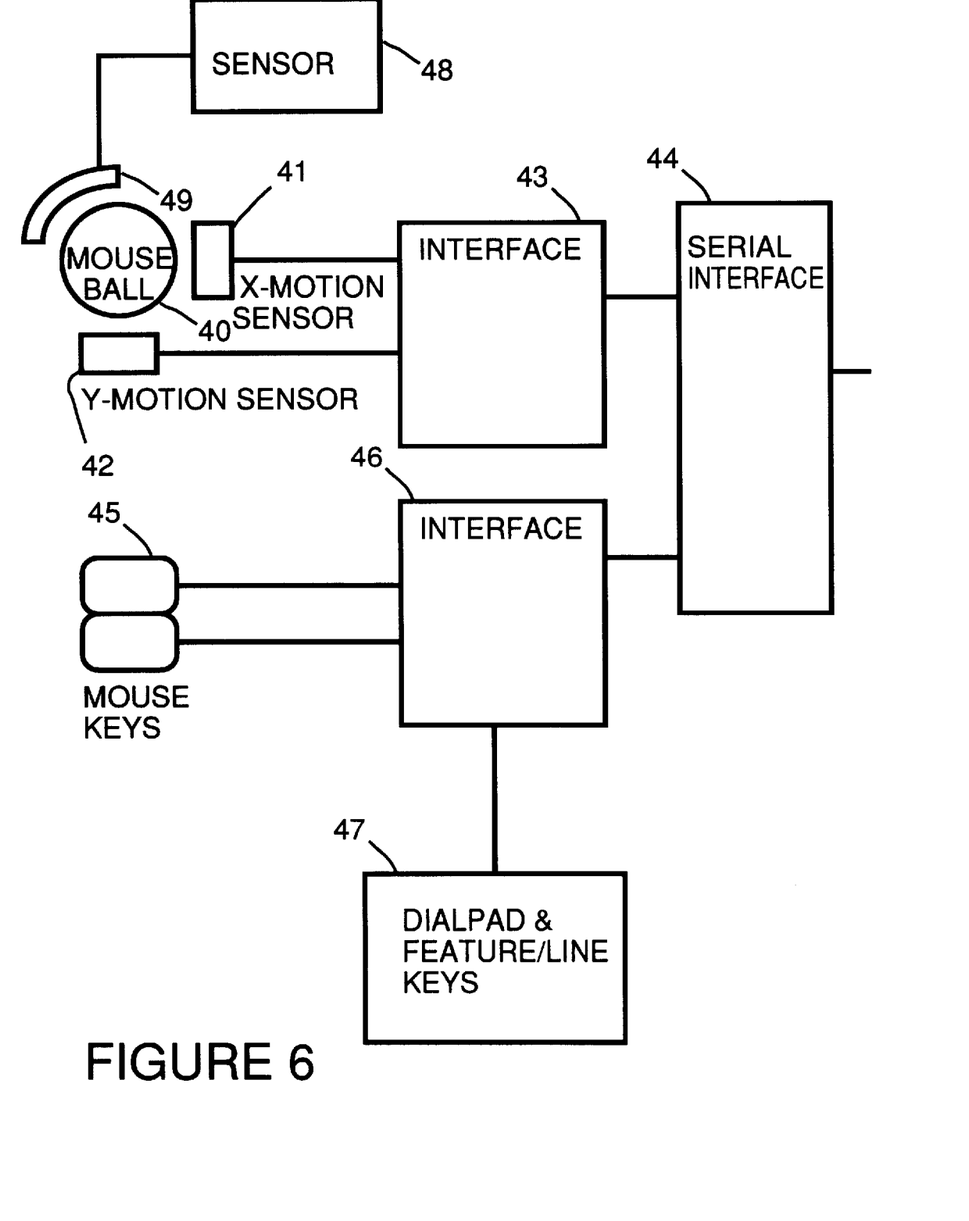
FIG. 6 shows a block diagram of circuitry within a mouse input device with a dialpad placed on the surface of the mouse input device with the additional feature of mouse motion inhibition, in accordance with a preferred embodiment of the present invention.

FIG. 6 shows an embodiment of a mouse input device, including a dialpad, with the additional feature of mouse motion inhibition. An interface 43, using an x-motion sensor 41 and a y-motion sensor 42, detects movement of mouse input device ball 40. Interface 43 sends motion data generated by x-motion sensor 41 and a y-motion sensor 42 to a serial interface 44. Serial interface 44 forwards the motion data to a host device such as a feature telephone or personal computer, as described above.

An interface 46 receives keystroke data from mouse input device keys 45. In addition, interface 46 receives keystroke data from a dialpad 47 along with any feature/line keys associated with dialpad 47 of the mouse input device. Interface 46 forwards keystroke information from mouse input device keys 45 and dialpad and feature/line keys 47 to serial interface 44. Serial interface 44 forwards the keystroke information to the host device.

A sensor 48 detects when the user is using the mouse input device as a normal pointing and selecting device and does not want the motion of the mouse input device restricted. When sensor 48 detects that the user is not using the mouse input device as a normal pointing and selecting device, sensor 48 will cause a motion restriction device 49 to restrict motion of mouse input device ball 40.

Motion restriction device 49 restricts motion of mouse input device ball by coming into contact with mouse input device ball 40 and preventing mouse input device ball 40 from moving. Alternatively, motion restriction device 49 is an electromagnet which retracts mouse input device ball 40 when the user is not utilizing the mouse input device as a pointing and selecting device. When mouse input device ball 40 is retracted, the mouse input device is solely resting on its bottom surface. This makes it much more difficult to slide the mouse input device on the desk surface. In this embodiment, the bottom surface of the mouse input device consists of a compliant material which gives a small amount of adhesion to the desk surface. When the electromagnet is de-activated, mouse input device ball 40 drops to its normal position and the mouse input device operates as normal. In order to allow the electromagnet to operate, mouse input device ball 40 includes ferrous material which responds to the magnetic field created by the electromagnet.

Figure 7:
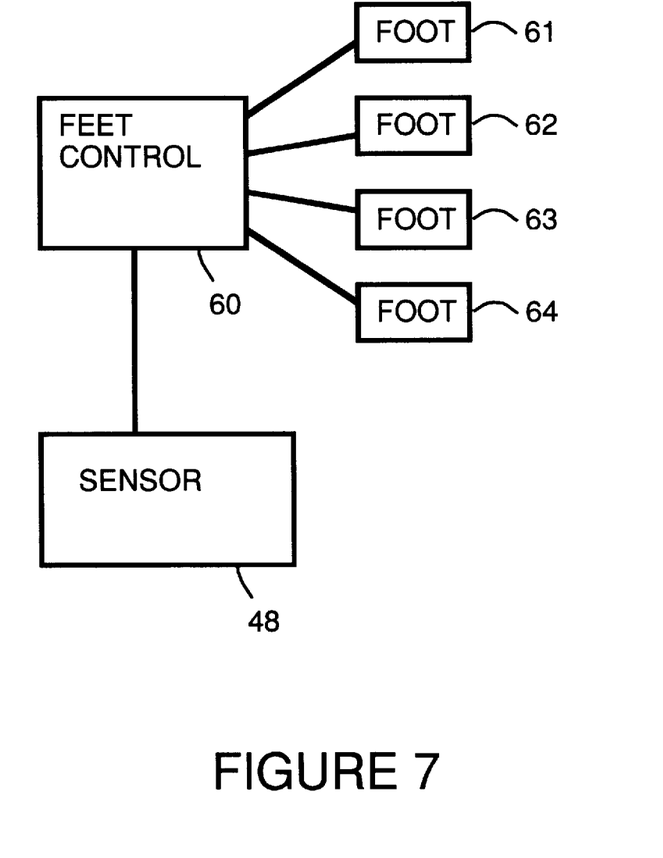
FIG. 7 shows use of "sticky feet" to implement mouse motion inhibition, in accordance with an alternative preferred embodiment of the present invention.
Figure 8:
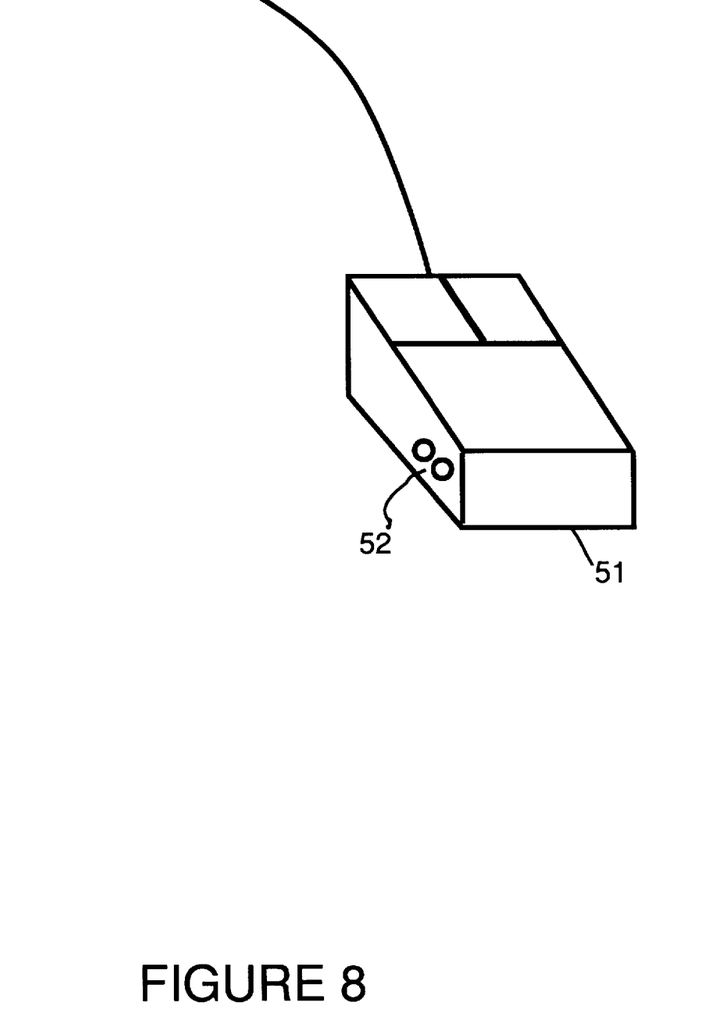
FIG. 8 shows a placement on a mouse input device of light detectors used to implement mouse motion inhibition, in accordance with a preferred embodiment of the present invention.

FIG. 7 shows an alternative embodiment for motion restriction. Mouse input device movement restriction is implemented by the extension of small "sticky" feet 61, 62, 63 and 64 from the bottom of the mouse input device which prevent sliding type movements of the mouse input device. Sensor 48 signals feet control 60 when sensor 48 detects that the user is not using the mouse input device as a normal pointing and selecting device. Upon receipt of this signal, feet control 60 causes feet 61, 62, 63 and 64 to extend from the bottom of the mouse input device which prevent sliding type movements of the mouse input device. When sensor 48 signals feet control 60 that the user is using the mouse input device as a normal pointing and selecting device, feet control 60 causes feet 61, 62, 63 and 64 to retract into the bottom of the mouse input device allowing the mouse input device to move freely. For example, feet control 60 is implemented using an electromagnet which controls the extension and retraction of feet 61, 62, 63 and 64. For the electromagnet to operate, feet 61, 62, 63 and 64 include ferrous material which responds to the magnetic field created by the electromagnet. Alternatively, feet control 60 is implemented using electromechanical relays which controls the extension and retraction of feet 61, 62, 63 and 64. In another embodiment, a purely mechanical implementation based on hand pressure on certain surfaces of the mouse input device controls extension and retraction of feet 61, 62, 63 and 64. FIG. 8 shows sensor 48 implemented by the placement on a mouse input device 51 of an ambient light detector 52 used to detect whether a user hand is placed over mouse input device 51. When a hand is placed over mouse input device 51, placement of the thumb of the user will reduce the amount of ambient light which reaches ambient light detector 52. Upon detection of the reduction in the amount of ambient light, movement of mouse input device 51 will be unrestricted, as described above. When ambient light detector 52 detects an increase in the amount of ambient light, movement of mouse input device 51 will be restricted, as described above. In the preferred embodiment, ambient light detectors are placed on both sides of mouse input device 51, in order to take into account use of mouse input device 51 by a left handed user. In this embodiment, when an ambient light detector on either side of mouse input device 51 detects a reduction in the amount of ambient light, movement of mouse input device 51 will be unrestricted. Otherwise, movement of mouse input device 51 will be restricted, as described above.

Sensor 48 may also be implemented using a toggle switch placed on the mouse input device, as shown by FIG. 5. When the user selects the feature phone, the motion of the mouse input device is restricted. Alternatively, motion of the mouse input device may be restricted in response to a depression of the line key. When the user selects the feature phone by depressing the line key, the motion of the mouse input device is restricted.

We claim:

1. An interface device comprising:

motion detecting means for detecting motion of the interface device over a surface;

selection means, for indicating a user selection;

numeric entry means on the interface device for allowing a user to input numbers to the interface device, wherein said numeric entry means includes a telephone dialpad; and motion restriction means for restricting motion of the interface device over the surface when the user uses the numeric entry means to input numbers to the interface device.

2. An interface device as in claim 1 wherein the dialpad for the telephone includes keys which are flush with a surface of the interface device, the keys being placed right next to each other.

3. An interface device as in claim 1 wherein the dialpad for the telephone includes keys which are within a well on a surface of the interface device.

4. An interface device as in claim 1 wherein the dialpad includes a line key.

5. An interface device as in claim 1 wherein the interface device is a mouse input device and the motion restriction means restricts motion of the interface device by hindering motion of a mouse input device ball within the mouse input device.

6. An interface device as in claim 1 wherein the interface device is a mouse input device and the motion restriction means restricts motion of the interface device by extending feet from a bottom of the mouse input device to the surface.

7. An interface device as in claim 1 wherein the interface device is a mouse input device and the motion restriction means is controlled by a sensor, the sensor detecting when a user's hand is holding the mouse input device.

8. An interface device as in claim 7 wherein the sensor includes an ambient light detector placed on a side of the mouse input device.

9. A method for using a mouse input device to provide input to a system comprising the following steps:

(a) detecting motion of the mouse input device over a surface;

(b) detecting selections made by a user on a mouse selection key; and, (c) receiving numeric entry from numeric entry keys on the mouse input device, wherein said numeric entry keys include a telephone dialpad, and wherein step (c) includes restricting motion of the mouse input device over the surface.

10. A method as in claim 9 wherein the dialpad for the telephone includes keys which are flush with a surface of the mouse input device, the keys being placed right next to each other.

11. A method as in claim 9 wherein the dialpad for the telephone includes keys which are within a well on a surface of the interface device.

12. A method as in claim 9 wherein in step (c) motion is restricted by hindering motion of a mouse input device ball within the mouse input device.

13. A method as in claim 9 wherein in step (c) motion is restricted by extending feet from a bottom of the mouse input device to the surface.

14. A method as in claim 9 wherein motion restriction is controlled by a sensor, the sensor detecting when a user's hand is holding the mouse input device.

15. A method as in claim 14 wherein the sensor detects ambient light using an ambient light detector placed on a side of the mouse input device.

16. A system comprising:

a personal computer;

a feature telephone coupled to the personal computer through a first data link;

a mouse input device, coupled to the feature telephone through a second data link, the mouse input device including motion detecting means for detecting motion of the mouse input device over a surface;

selection means, for indicating a user selection; numeric entry means on the mouse input device for allowing a user to input numbers to the mouse input device; and motion restriction means for restricting motion of the mouse input device over the surface to facilitate the user using the numeric entry means to input numbers to the mouse input device.

17. A system as in claim 16 wherein the mouse input device includes a switch, a state of the switch indicating whether information gathered by the mouse input device is for the personal computer or for the feature telephone.

18. An interface device comprising:

motion detecting means for detecting motion of the interface device over a surface;

selection means, for indicating a user selection;

numeric entry means on the interface device for allowing a user to input numbers to the interface device; and motion restriction means for restricting motion of the interface device over the surface when the user uses the numeric entry means to input numbers to the interface device.

19. An interface device as in claim 18 wherein said motion restriction means includes feet that extend when said numeric entry means is used to input numbers to the interface device.

20. An interface device as in claim 18 wherein said motion restriction means includes preventing said motion.

21. A method as in claim 20 wherein motion restriction means includes retraction of said motion detecting means.

22. An interface device as in claim 18 wherein said motion restriction means is controlled by a sensor that senses that a user's hand is positioned to input numbers.

23. A method for using a mouse input device to provide input to a system comprising the following steps:

(a) detecting motion of the mouse input device over a surface;

(b) detecting selections made by a user on a mouse selection key; and (c) receiving numeric entry from numeric entry keys on the mouse input device, wherein when said numeric entry is entered, motion restriction means are activated to restrict motion of said mouse input device over said surface.

24. A method as in claim 23 wherein said motion restriction means includes feet that extend when said numeric entry means is used to input numbers to the interface device.

25. A method as in claim 23 wherein said motion restriction means includes retraction of said motion detecting means to prevent said motion detecting means detecting motion of the interface device over the surface.

26. A method as in claim 23 wherein said motion restriction means is controlled by a sensor that senses that a user's hand is positioned to input numbers.

\* \* \* \* \*